(12) United States Patent
Swackhamer

(10) Patent No.: US 10,972,484 B1
(45) Date of Patent: Apr. 6, 2021

(54) ENRICHING MALWARE INFORMATION FOR USE WITH NETWORK SECURITY ANALYSIS AND MALWARE DETECTION

(71) Applicant: Target Brands, Inc., Minneapolis, MN (US)

(72) Inventor: Allen M. Swackhamer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 208 days.

(21) Appl. No.: 15/997,437

(22) Filed: Jun. 4, 2018

(51) Int. Cl.
*H04L 29/06* (2006.01)

(52) U.S. Cl.
CPC ...... *H04L 63/1416* (2013.01); *H04L 63/1425* (2013.01); *H04L 63/20* (2013.01)

(58) Field of Classification Search
CPC . H04L 63/1416; H04L 63/1425; H04L 63/20; H04L 63/14; H04L 63/1408
See application file for complete search history.

(56) References Cited

U.S. PATENT DOCUMENTS

| 7,529,727 | B2 | 5/2009 | Arning et al. |
| 8,635,694 | B2 | 1/2014 | Malyshev et al. |
| 9,021,260 | B1* | 4/2015 | Falk ................... G06F 21/6218 713/165 |
| 9,038,177 | B1* | 5/2015 | Tierney ............. H04L 29/06891 709/224 |
| 9,069,957 | B2 | 6/2015 | Tuvell et al. |
| 9,882,929 | B1* | 1/2018 | Ettema ................ G06F 9/45533 |

| 2014/0359761 | A1 | 12/2014 | Altman et al. |
| 2015/0244733 | A1 | 8/2015 | Mohaisen et al. |
| 2016/0314298 | A1* | 10/2016 | Martini ................... G06F 21/53 |
| 2017/0063888 | A1 | 3/2017 | Muddu et al. |

(Continued)

OTHER PUBLICATIONS aws.amazon.cpm' [online] Denney. G., "How to Visualize and Refine Your Network's Security by Adding Security Group IDs to Your VPC Flow Logs," May 3, 2017, Retrieved Jul. 21, 2017, Retrieved online: URL <https://aws.amazom.com/blogs/security/how-to-visualize-and-refine-your-networks-security-by-adding-security-group-ids-to-your-vpc-flow-logs/>, 18 pages.

(Continued)

*Primary Examiner* — Daniel B Potratz
*Assistant Examiner* — Wansik You
(74) *Attorney, Agent, or Firm* — Fish & Richardson P.C.

(57) ABSTRACT

One or more malware data pipelines is configured to provide malware data that includes original data fields identifying information for detected malware instances and corresponding files that are associated with the detected malware instances. Malware enrichment circuitry is configured to identify additional information to include in enriched data fields for the detected malware instances, the additional information being identified from one or more of: the original data fields, the corresponding files, and one or more third party services. A datastore is configured to store the malware data with the original data fields and the enriched data fields, wherein the datastore includes indices for both the original data fields and the enriched data fields to permit for searching and analysis across the original data fields and the enriched data fields.

17 Claims, 7 Drawing Sheets

(56) References Cited

U.S. PATENT DOCUMENTS

2019/0028508 A1* 1/2019 Jeng .................... H04L 63/1425
2019/0095510 A1* 3/2019 Cruise ................. G06F 11/3452

OTHER PUBLICATIONS elastic.co' [online] Paquette. M., "Using Machine Learning and Elasticsearch for Security Analytics: A Deep Dive," May 17, 2017, Retrieved Jul. 21, 2017, Retrieved online: URL <https://www.elastic.co/blog/using-machine-learning-and-elasticsearch-for-security-analytics-deep-dive>, 9 pages.
elastic.co' [online] Smith. T., "Integrating Bro IDS with the elastic stack," Mar. 17, 2016, Retrieved Jul. 21, 2017, Retrieved online: URL <https://www.elastic.co/blog/bro-ids-elastic-stack>, 11 pages.
gartner.com' [online] Chuvakin. A., "How to Make Better Threat Intelligence Out of Threat Intelligence Data?," Feb. 19, 2014, Retrieved Aug. 1, 2018, Retrieved Online: URL <https://blogs.gartner.com/anton-chuvakin/2014/02/19/how-to-make-better-threat-intelligence-out-of-threat-intelligence-data/>, 4 pages.
splunk.com' [online] Patel. B., "Enriching threat feeds with WHOIS information,"May 2, 2016, Retrieved Aug. 1, 2018, Retrieved Online: URL <https://www.splunk.com/blog/2016/05/02/enriching-threat-feeds-with-whois-information-splunk.html>, 9 pages.
Svajcer. V., "Building a malware lab in the age of big data," *Virus Bulletin Conference.*, Sep. 2015, 12 pages.
symantec.com' [online] "Data Enrichment," Retrieved Aug. 1, 2018, Retrieved Online: URL <https://origin-symwisedownload.symantec.com/resources/webguides/security_analytics/7.2/platform_webguide/desktop/ENG/Data_Enrichment/Providers/_enrichment_providers.htm>, 4 pages.
Wolff and Chisholm., "High dimensional visualization of malware families," *RSA Conference.*, Jul. 22-24, 2015, 34 pages.
U.S. Appl. No. 15/997,479, filed Jun. 4, 2018, Swackhamer.
U.S. Appl. No. 15/997,455, filed Jun. 4, 2018, Swackhamer.

* cited by examiner

ENRICHING MALWARE INFORMATION FOR USE WITH NETWORK SECURITY ANALYSIS AND MALWARE DETECTION

The present document generally relates to computer network security.

BACKGROUND

Computer networks include hardware and software that allow nodes on the network to share data with other nodes. Network security includes policies, practices, and devices adopted to prevent and monitor unwanted access, misuse, modification, or attacks on computer networks and network-accessible resources. Malware includes software that preforms malicious actions on one or more nodes within a network, such as software with malicious code that is executed/interpreted by nodes within a network. Malware can expose not only the machine that is executing/interpreting the malicious code to vulnerabilities (e.g., cause the machine to download more malicious code, cause machine to transmit sensitive information to an external system/computer, cause machine to destroy/encrypt data stored on the machine), but it can expose other nodes within the network to malicious attacks. For example, nodes within a network may trust communications and instructions from other nodes within the network. However, once compromised, nodes may not be able to readily differentiate between secure (uncompromised) nodes and compromised nodes running malicious code. Detecting and preventing malware within a network is a constant challenge as software running on devices is constantly changing, creating possible new security vulnerabilities, and as malware evolves in attempts to exploit those vulnerabilities.

SUMMARY

This document generally describes computer systems, processes, program products, and devices for enriching malware data with other external data that can be used to more robustly analyze and detect malware threats. There are a variety of malware reporting services (e.g., VIRUSTOTAL) that provide a stream of malware data identifying malware detected across various networks, some of which can include data resulting from static and/or dynamic analysis. However, this malware data can be provided with a minimum set of basic information on malware instances, such as information identifying the malware (e.g., malware file, hash), the source of the malware (e.g., domain, IP address), and the time when the malware was received. The computer systems, processes, program products, and devices described in this document can enrich (augment) such malware data to include a variety of additional and related details that permit for additional connections between malware instances, malware sources, and other factors to be generated, and that permit for more robust analysis to be performed. Such data enrichment can permit a variety of enhanced threat detection features to be provided to and used by analysts, which can improve the identification and mitigation of network security threats.

In some implementations, systems can be used for enriching malware data for security analysis. The system includes one or more malware data pipelines configured to provide malware data that includes original data fields identifying information for detected malware instances and corresponding files that are associated with the detected malware instances; malware enrichment circuitry configured to identify additional information to include in enriched data fields for the detected malware instances, the additional information being identified from one or more of: the original data fields, the corresponding files, and one or more third party services; and a datastore configured to store the malware data with the original data fields and the enriched data fields, wherein the datastore includes indices for both the original data fields and the enriched data fields to permit for searching and analysis across the original data fields and the enriched data fields.

In some implementations, methods include providing malware data that includes original data fields identifying information for detected malware instances and corresponding files that are associated with the detected malware instances; identifying additional information to include in enriched data fields for the detected malware instances, the additional information being identified from one or more of: the original data fields, the corresponding files, and one or more third party services; and storing, in a datastore configured to store the malware data with the original data fields and the enriched data fields, the malware data with the original data fields and the enriched data fields, wherein the datastore includes indices for both the original data fields and the enriched data fields to permit for searching and analysis across the original data fields and the enriched data fields.

In some implementations, computer storage media encoded with computer program instructions that, when executed by one or more processors, cause a computer device to perform operations that include providing malware data that includes original data fields identifying information for detected malware instances and corresponding files that are associated with the detected malware instances; identifying additional information to include in enriched data fields for the detected malware instances, the additional information being identified from one or more of: the original data fields, the corresponding files, and one or more third party services; and storing, in a datastore configured to store the malware data with the original data fields and the enriched data fields, the malware data with the original data fields and the enriched data fields, wherein the datastore includes indices for both the original data fields and the enriched data fields to permit for searching and analysis across the original data fields and the enriched data fields.

Implementations can optionally include any, all, or none of the elements described above or the elements described in further detail below. The corresponding files include emails with attachments that included the detected malware instances, and the enriched data fields include the additional information extracted from the emails. The enriched data fields include one or more of: email sender information, email receiver information, email subject information, email message body information, email attachment information, and email header information. The corresponding files include malware trace files generated from the detected malware instances running on a computing device, and the enriched data fields include the additional information extracted from the malware trace files. The enriched data fields include one or more of: an IP address from which the malware originated, an IP address at which the malware was detected, a network port the malware attempted to exploit, domain name system information, and network transmission protocols. The corresponding files include office documents with macros that included the detected malware instances, and the enriched data fields include the additional information extracted from the office documents. The enriched data fields include one or more of: author information for the office documents, time of creation for the office documents, edit history for the office documents, office version information, size of office document, type of content included in office document, language used for the macros, version of the language for the macros, function calls used for the macros, permissions for the office documents, linked libraries for the office documents, and encodings included in the office documents. The office documents include WORD documents, POWERPOINT presentation documents, and EXCEL spreadsheet documents. The corresponding files include malware process behavior trace files generated from running the detected malware instances, and the enriched data fields include the additional information extracted from the malware process behavior trace files. The enriched data fields include one or more of: an IP address from which the malware originated, an IP address at which the malware was detected, a network port the malware attempted to exploit, domain name system information, and network transmission protocols. The corresponding files include office documents with macros that included the detected malware instances, and the enriched data fields include the additional information extracted from the office documents. The enriched data fields include one or more of: author information for the office documents, time of creation for the office documents, edit history for the office documents, office version information, size of office document, type of content included in office document, language used for the macros, version of the language for the macros, function calls used for the macros, permissions for the office documents, linked libraries for the office documents, and encodings included in the office documents. The office documents include WORD documents, POWERPOINT presentation documents, and EXCEL spreadsheet documents. The corresponding files include malware process behavior trace files generated from running the detected malware instances, and the enriched data fields include the additional information extracted from the malware process behavior trace files. the enriched data fields include one or more of: file system behavior for the detected malware instances, process behavior for the detected malware instances, registry behavior for the detected malware instances, service behavior for the detected malware instances, thread behavior for the detected malware instances, and network behavior for the detected malware instances. The one or more third party services include services to track votes from security analysts as to whether the detected malware instances are malicious or benign, and the enriched data fields include the additional information obtained from the services to track votes for the detected malware instances. The one or more third party services include services to track votes from security analysts as to whether the detected malware instances are malicious or benign, and the enriched data fields include the additional information obtained from the services to track votes for the detected malware instances. The one or more third party services include location services to provide geographic location information correlated to the detected malware instances are malicious or benign, and the enriched data fields include the additional information obtained from the location services for the detected malware instances. The one or more third party services include historical malware information services to provide historical information on the detected malware instances are malicious or benign, and the enriched data fields include the additional information obtained from the historical malware information services for the detected malware instances. The one or more malware data pipelines include: a static information pipeline configured to generate enriched and formatted static data, the enriched and formatted static data being enriched by the malware enrichment circuitry and formatted according to a first data format that is associated with static data related to malware, the enriched and formatted static data recording information about malware generated during static analyses of malware performed outside of a network to be protected by the system, and a dynamic information pipeline configured to generate enriched and formatted dynamic data, the enriched and formatted dynamic data being enriched by the malware enrichment circuitry and formatted according to a second data format different than the first data format, the second data format being associated with dynamic data related to malware, the enriched and formatted dynamic data recording information about malware generated during dynamic analyses of malware performed within a network to be protected by the system. The datastore is further configured to: receive and store the enriched and formatted static data; receive and store the enriched and formatted dynamic data; generate indices that link stored enriched and formatted static data and the enriched and stored formatted dynamic data that share similar properties; receive a first query; select, using the indices, first response data for the first query from the stored enriched and formatted static data and from the enriched and stored formatted dynamic data; return a first response to the first query comprising the first response data; after returning the first response, receive a second query that contains, as a search parameter, a subset of the first response data; select, using the indices and based on the search parameter, second response data for the second query from the stored enriched and formatted static data and from the stored enriched and formatted dynamic data; and return a second response to the second query comprising the second response data.

The systems, devices, program products, and processes described throughout this document can, in some instances, provide one or more of the following advantages. Computer network security can be improved. For example, the technology of computer and network security can be improved. Malware data can be enriched, which can permit disparate pieces of information to be more easily and more efficiently discovered—permitting a shift from reactive malware detection to proactive malware prevention. For example, enriched data in a database related to similar events can be more readily found and used as the basis for a new search in a way that exposes relevant information to a user that is attempting to search through a large amount of data. Malware data enrichments can be performed prior to the data being added to the database and queried, which can provide overall improvements in system efficiency. For example, instead of attempting to query for additional information related to malware as queries are being run, malware data can be enriched as it is being ingested into the system, which can then streamline the malware analysis.

Other features, aspects and potential advantages will be apparent from the accompanying description and figures.

DESCRIPTION OF DRAWINGS

Like reference symbols in the various drawings indicate like elements

DETAILED DESCRIPTION

Figure 1:
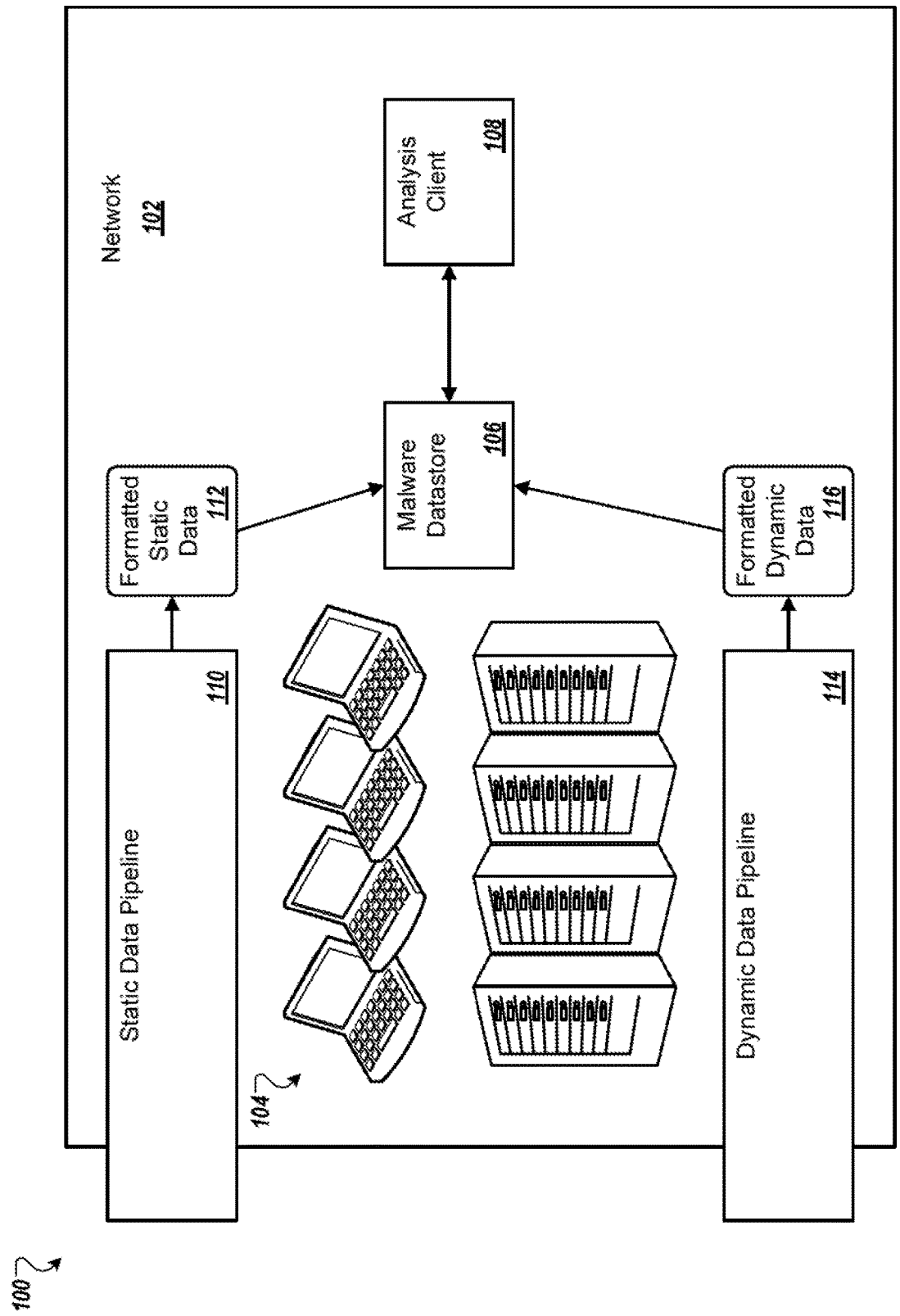
FIG. 1 is a block diagram of an example system for creating a database to record and enrich static and dynamic information about malware.

Systems and databases can be used to enrich and store data related to malware for use by security systems and actors that are protecting a network or other computing resource. Such a database can collect, combine, and enrich information from two pipelines, with one pipeline providing static data and another pipeline providing dynamic data. For example, the static and dynamic results can be enriched and combined into a single file that can be indexed. In other examples, static and dynamic results can stored separately (e.g., stored in separate files and indexed separately), but can be enriched and correlated with each other. The static data can include information learned about malware through static analysis while the dynamic data can include information learned about malware through dynamic analysis.

Enrichments can add contextual information to malware data (e.g., static malware data, dynamic malware data, other malware data) that can be used by analysts during runtime to better identify connections and associations between different malware instances. Enrichments can include, for example, adding supplemental information to the malware data received by the system (such as from malware reporting services, like VIRUSTOTAL) that is otherwise not provided by or identified in the malware data. For example, each malware data instance that is received can include various data fields and, in some cases, the files related to the malware, such as the malware itself, a trace of the operations performed by the malware, a carrier for the malware (e.g., email that included the malware as an attachment), and/or other relevant files. The data fields may provide rudimentary information, such as a timestamp when the malware was detected, an IP address from which the malware originated, a point of attack, a geographic location where the malware was detected, and/or other information. The malware data can be enriched by teasing out additional contextual information from the malware data itself and/or from external data sources. For example, malware data can be enriched with internal information that adds additional data fields to the received malware data record that are otherwise buried within the malware data and not readily searchable (or indexed). In another example, malware data can be enriched by querying third party services for additional information to augment the malware data, such as by using one or more portions of information from the malware data to query a third party service.

A variety of different malware data enrichments can be performed. For example, malware data can be enriched to include additional information identifying functions and/or libraries that the malware instances import, include, exports, and/or otherwise link to. Such an enrichment can be determined from the malware data itself, for example, by analyzing the malware file to identify library and/or functional dependencies, which can then be added as indexable fields to the malware data using one or more identifiers for the libraries and/or functional dependencies (e.g., textual identifier, unique identifier, name, version).

In another example, details from the carrier of the malware can identified and used to enrich the malware, such as information from emails that included the malware as an attachment. Such enrichments can include, for example, analysis of files that are included with the malware data to obtain email (and/or other malware carrier information) details, such sender information (e.g., email address, IP address), receiver information, subject (e.g., title, keywords), message body information (e.g., keywords used, textual encoding, message type, language), attachment information (e.g., number of attachments, types of attachments, attachment file names), email header information (e.g., originating server, timestamp), and/or other email details. Such malware carrier information can be identified from the malware data and used to enrich the malware data by being added as indexable data fields that can be readily searched and correlated with other malware data records.

In another example, network details regarding the malwares point of entry and/or transmission path can be identified and used to enrich the malware data. For example, malware trace information that is included with the malware data can be analyzed and used to identify location information for the malware (e.g., IP address from which the malware originated, geographic region from which the malware originated, IP address at which the malware was detected, geographic region where the malware was detected), an entry point onto the network (e.g., network port used), domain name system (DNS) information (e.g., DNS identifier for the sender, DNS identifier for the recipient), network transmission protocols that were used (e.g., HTTP, FTP, SMTP, POP), and/or other network information. Such network information can be identified from the malware data and used to enrich the malware data by being added as indexable data fields that can be readily searched and correlated with other malware data records.

In another example, document information (e.g., MS OFFICE document information) can be identified and used to enrich the malware data. For example, an MS OFFICE document (or portions thereof) can be included with malware data because it includes malicious macro code. The document can be analyzed to identify additional information that can be added as indexable and searchable data fields to the malware data, such as metadata (e.g., author, time of creation, edit history, MS OFFICE version), presentation information (e.g., number of slides, type of content included in slides, slide transitions), macro information (e.g., macro language and version, function calls), and/or other document information. Similarly, rich text formatted documents can be analyzed for information that can be added as data fields to enrich the malware data, such as identifying metadata, formatting, language information, and/or other details. Other formatted data files can also be analyzed, such as pdf documents, which can be analyzed for metadata, linked libraries, permissions, encodings, and/or other details.

In another example, malware process behavior can be identified and used to enrich malware data. Malware process behavior can include, for example, dynamic operations that are performed by the malware. Information on the malware process behavior can be included with the malware data, such as through process trace information captured by the machine running/detecting the malware, and/or through dynamic analysis of the malware itself, such as by a malware reporting service. Details on the malware process behavior can be extracted and added as data fields to enrich the malware data, such as by extracting and adding information related to file system behavior (e.g., file system operations requested/performed by the malware), process behavior (e.g., CPU usage, memory usage, operations requested/performed), registry behavior (e.g., registry read/write operations performed/requested), service behavior (e.g., services accessed by the malware), thread behavior (e.g., number of threads instantiated by the malware), network behavior (e.g., network sockets requested, network traffic, sender/receiver information for network traffic), and/or other process behavior.

In another example, external data sources (e.g., third party services) can be referenced to enhance the malware data. For example, third party services can track and/or aggregate votes that indicate whether other security analysts/firms have identified code as malicious, harmless, and/or other designators. Such vote information can be added as one or more data fields that are indexable and searchable to further enrich the malware data. In another example, location information can be generated from one or more third party services, which can correlate various information from the malware data (e.g., IP address) into geolocation information (e.g., city, state, country, region) that can be added as indexable and searchable data fields to enrich the malware data. In another example, historical information for malware instances can be referenced from one or more third party services, such as a date on which the malware instance was first detected, a date on which it was last detected, a frequency over a recent period of time (e.g., number of detections per day over the past week, month, year), and/or other details. Such historical information can be referenced from a third party service, which may be the enriched malware data repository itself, and can be added to the malware data to further enrich the data for searching and analysis.

Such enriched malware database can be built to include indices correlate all of the malware data fields and different types of malware data together, including correlating the static data with the dynamic data (and vice versa). For example, some malware may be subjected to static analysis that is provided in a first dataset, such as first data streams, feeds, or pipelines. Then, in an unrelated analysis, the same or similar malware may be subjected to a dynamic analysis that is provided in a second dataset, such as second data streams, feeds, or pipelines. Even with access to streams of static and dynamic data about many types of malware, it is difficult to match the static and dynamic data for a particular piece of malware. This document describes a database system that is designed to allow a user to enrich this data and to draw this data together through the use of indices and search queries, which can be enhanced by the data enrichment.

For example, individuals and/or groups, such as third party security groups (security operation centers (SOC)) and/or government agencies, can submit malware information to security services (e.g., VIRUSTOTAL) that aggregate and distribute malware information for analysis and other security uses. The malware information can include any of a variety of details about malware instances, which in some instances can include things such as the output of static analysis toolsets and/or rule sets that were used to detect/prevent/secure an environment from the malware instances. Such information can be enriched and then stored, as described above, and then used to analyze and identify malware instances, including using rule sets (and/or modifications thereof) that are being provided by the security services. This malware information can be provided as part of a third party's data feed that contains data about many types of malware, which can be enriched before it is stored and analyzed. At a later time, a security analyst may discover that there has been an instance of an attempted attack on a network through querying the enriched data. Unbeknownst to the analyst, this is the same malware that was analyzed by the third party security group. The analyst may make use of technologies described here to use information about the attack to seek out the related static data (if it exists) and to use the mix of static and dynamic data to gain a more holistic understanding of the attack and related malware. These connections between disparate malware instances can be enhanced through the use of enriched malware data, which can be added in an indexable and readily searchable format.

To provide this functionality, the database can enrich the data and can enforce data format constraints on the static and the dynamic data. These constraints can include listings of fields that must be included with data about malware, including enriched data fields for the malware. For example, static data may be required to include a malware name, an MD5 hash, a file name, or a unique identifier. Dynamic data may be required to include information such as date of execution, listings of sensitive files accessed, etc. In addition, both static and dynamic data may be required to include the same subset of fields for use in matching static and dynamic data about the same or similar malware. For example, a malware-classification field may be required, with optional values such as Trojan, dropper, file encrypted, etc. Use of this field can allow results to be returned that can be used in other queries, for example, such as through pipeline aggregations and/or other appropriate techniques. These techniques, along with other database querying, can allow a user to view some data and then quickly access data that may be related to the viewed data.

FIG. 1 is a block diagram of an example system 100 for creating a database to record static and dynamic information about malware. In the system 100, a network 102 is being protected by one or more security analysts. The security analysts are users that are tasked with monitoring the security state of the network 102 and to prevent malicious activity like malware execution, data exfiltration, etc.

The network 102 is, for example, a local network, intranet, virtual private network, or other data network used by an organization. The network 102 can include networking hardware such as cables, wireless access points, routers, gateways, firewalls, etc., that work together to allow resident machines 104 to communicate with other resident machines 104 and with computing resources outside of the network 102. The resident machines 104 can include, but are not limited to, personal computers, servers, and mobile devices.

Operations of the network 102 and resident machines 104 may come under attack from malicious actors—users and/or automated services that seek to exploit computing resources they do not own or have authorization to use. The security analysts can stop or attempt to stop these attacks through security countermeasures. These security countermeasures can include anti-malware applications running on the resident machines 104, edge security such as firewalls or gateway sandboxes, and behavior monitoring of the resident machines 104. A malware datastore 106 can be used to store information about malware, malware attacks, and related security incidents. The security analysts can use an analysis client 108 to query contents of the malware datastore 106 in order to search for correspondences, correlations, and other inferences between malware, malware attacks, etc.

To populate the malware datastore 106, the network 102 can use a static data pipeline 110 and a dynamic data pipeline 114 to generate formatted static data 112 and formatted dynamic data 116, respectively. The formatted static data 112 and the formatted dynamic data 116 can be enriched using one or more of the example data enrichments described above (or others), and can be stored as enriched data in the malware data store 106. Generally speaking, static data refers to data about malware that is created during static analysis of malware in which the malware is not executed. This information can include, for example, a hash of a file, a file name, a date first encountered, a compile-time stamp, etc. Dynamic data refers to data about malware that is created with execution of the malware. This information can include, for example, behavior signatures, files or network resources read or written to, behavior classifications, counter-security measures, etc.

The static data pipeline 110 collects, aggregates, enriches, and formats static data from one or more sources to create formatted static data 112. This may include, for example, collecting data from one or more external security vendors and one or more sources within the network 102. This data may take different format depending on the source of the static data, and the static data pipeline can enrich the data based on analysis of the malware data itself or from accessing one or more external sources (e.g., third party services), and can reformat the data according to a predetermined data format to create the formatted static data 112. In this way, all of the static data, regardless of the source, can be made to conform to a single format.

The dynamic data pipeline 114 collects, aggregates, enriches, and formats dynamic data from one or more sources to create formatted dynamic data 114. This may include, for example, collecting data from one or more external security vendors and one or more sources within the network 102. This data may take different format depending on the source of the dynamic data, and the dynamic data pipeline can enrich the data based on analysis of the malware data itself or from accessing one or more external sources (e.g., third party services), and can reformat the data according to a predetermined data format to create the formatted 116. In this way, all of the static and data, regardless of source, can be made to conform to a single format.

The static and dynamic formats may be different. For example, each format may list a collection of fields that must be in each record, but these fields may be different for the two different types of data. This may be due, for example, to the different types of fields that are appropriate for static and dynamic data. A subset of the fields may be the same in both formats. For example, a hash is often used to provide a fingerprint or identification value for malware files, and thus the same hash field may be in both formats.

The formatted static data 112 and formatted dynamic data 116 may be continuously created by the static data pipeline and dynamic data pipeline as input to the pipelines become available. As the formatted static data 112 and formatted dynamic data 116 is created, the malware datastore 106 can receive the data and continuously update its contents. Then, as search queries are received from the analysis client 108, the malware datastore 106 can provide up-to-date search results to the analysis client 108.

Figure 2:
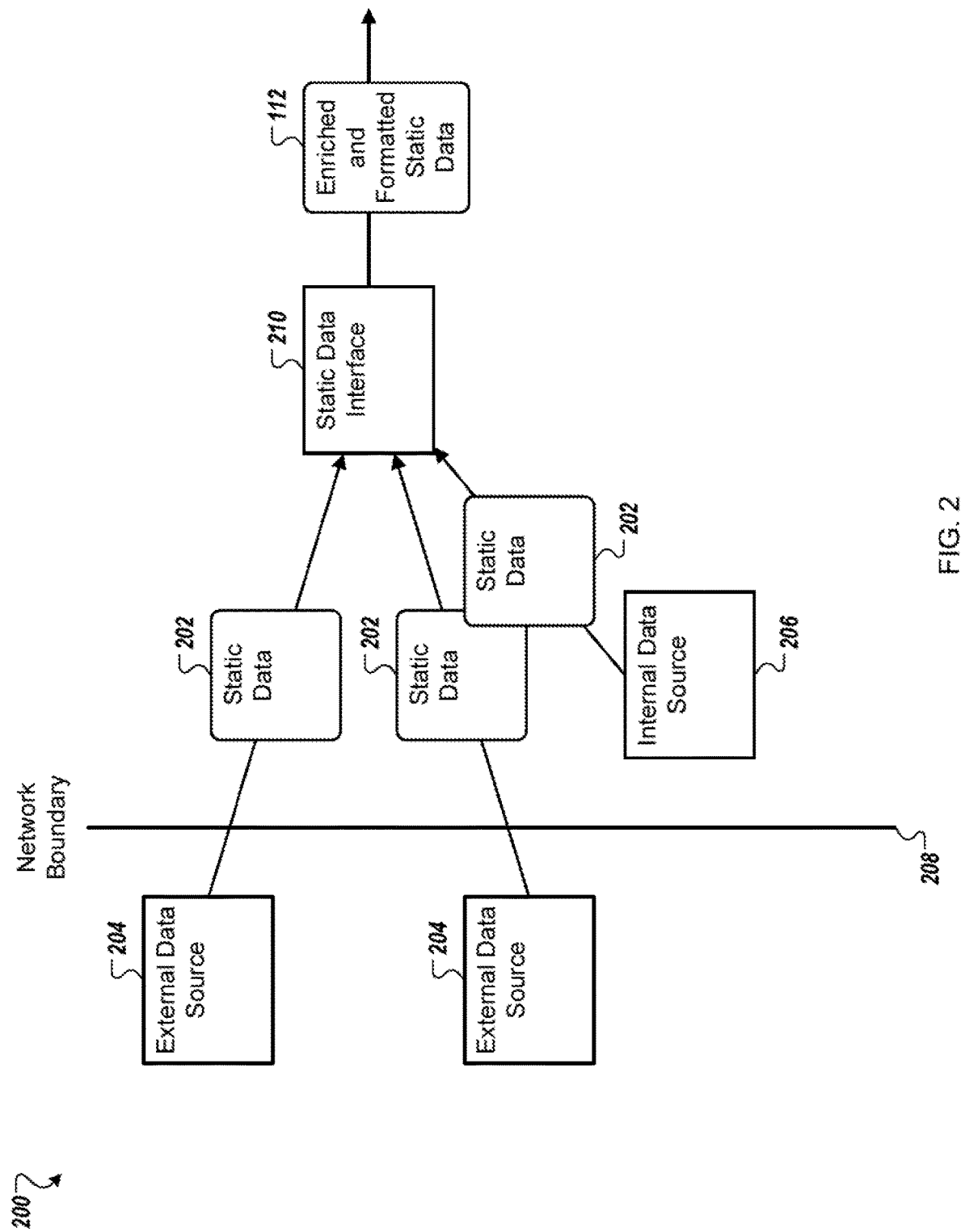
FIG. 2 is a block diagram of an example system for generating enriched and formatted static data.

FIG. 2 is a block diagram of an example system 200 for generating enriched and formatted static 112 data. The system 200 may be used, for example, to create the static data pipeline 110 discussed above by augmenting and enriching external data sources 204 providing static data 202, which can be combined with internal data sources 206 also providing static data 202 that can also be augmented and enriched. However, another system or systems may be used to create a static data pipeline 110. The system 200 can take the results that are provided by both the external data sources 204 and the internal data sources 206, and can format them into a schema (formatted static data 112) that can be readily used by security analysts to query and use through one or more user interfaces. The system 200 can provide one or more programmatic APIs that can perform one or more of these translations from the static data 202 into the formatted static data 112.

In the system 200, data from various data sources is collected. Generally speaking, these data sources provide subscribers with security information. This security information can include static data 202 about malware, threat intelligence, news items related to security issues, and the like. In some cases, the data sources provide this information for a fee such as a subscription fee. In some cases, the data sources provide this information for free to interested parties. In some cases, the data sources are owned and/or administered by the owner and/or administrator of the network 102 and provide this information in an effort to secure the network 102.

In the system 200, data from various data sources is aggregated. The data sources may be owned and/or administered by different parties. The data sources may provide the data along different communication channels such as email alerts, Rich Site Summary (RSS) feeds, etc. The system 200 can be configured to receive the information along any of these communication channels and then aggregate the information down to one unified communication channel.

In the system 200, data from various sources is formatted into a single common data format. The various data sources may provide their data according to one or more, or no, data formats that may or may not be shared by any other data format. The system 200 can translate data in these disparate formats into a single common format. This single common format may define, for each entry of information, a particular plurality of fields. For incoming data that is in a structured format (e.g., JavaScript Object Notation (JSON) or Extensible Markup Language (XML)) the system 200 can reformat the fields of the incoming data to match the defined format for static data. For incoming data that is unstructured (e.g., natural language) the system 200 can process the unstructured data to extract information needed for the fields of the defined format for static data.

The system 200 includes external data sources 204 and internal data sources 206. The external data sources are situated outside of a network, beyond a network boundary 208. Internal data sources 206 are situated on a network, within the network boundary 208. The network boundary 208 may be, for example, a boundary of the network 102. The external data sources may collect and provide static 202 about malware encountered outside of the network. For example, when a different network is attacked with malware, a security service may perform a static analysis of the malware and provide associated static data 202 to the system 200 as well as many other networks that subscribe to the security service. The internal data source 206 may run static analysis on malware discovered within the network boundary 208, for example malware that attacks resident machine 104.

Each of the external data sources 204 and the internal data source 206 can provide static data 202 to a static data interface 210. The static data 202 may come into the static data interface 210 along one or more different communication channels and formatted according to one or more different formats. As such, the static data interface 210 can be configured to receive data along different communication channels. The static data interface 210 can also be configured to reformat the static data 202 into a formatted static data 112 such that all the formatted static data 112 conforms to a single format. The formatted static data 112 can include information about malware generated during static analyses of malware performed outside of a network to be protected by the system, such as from external data sources 204. The formatted static data 112 can also or alternatively include information about malware generated during static analyses of malware performed inside of the network to be protected by the system, such as from internal data source 206.

Although a particular number and types of elements are shown in the system 200, it will be understood that different numbers and types of elements may be used to create the same or similar results. For example, more or fewer external data sources 204 and/or internal data sources 206 may be used, including no such information sources internal to the network or external to the network. Some of the static data 202 may come into the static data interface 210 already formatted according to the data format used by the formatted static data 112. In addition to the data format used by the formatted static data 112, some of the data may also be formatted according to one or more other data formats. Each element may be made of one or more sub-elements. For example, that static data interface 210 may include an input-module for each communication channel along which static data 202 comes in. The static data interface 210 may include one or more translation modules for translating different static data 202 into the formatted static data 112.

Figure 3:
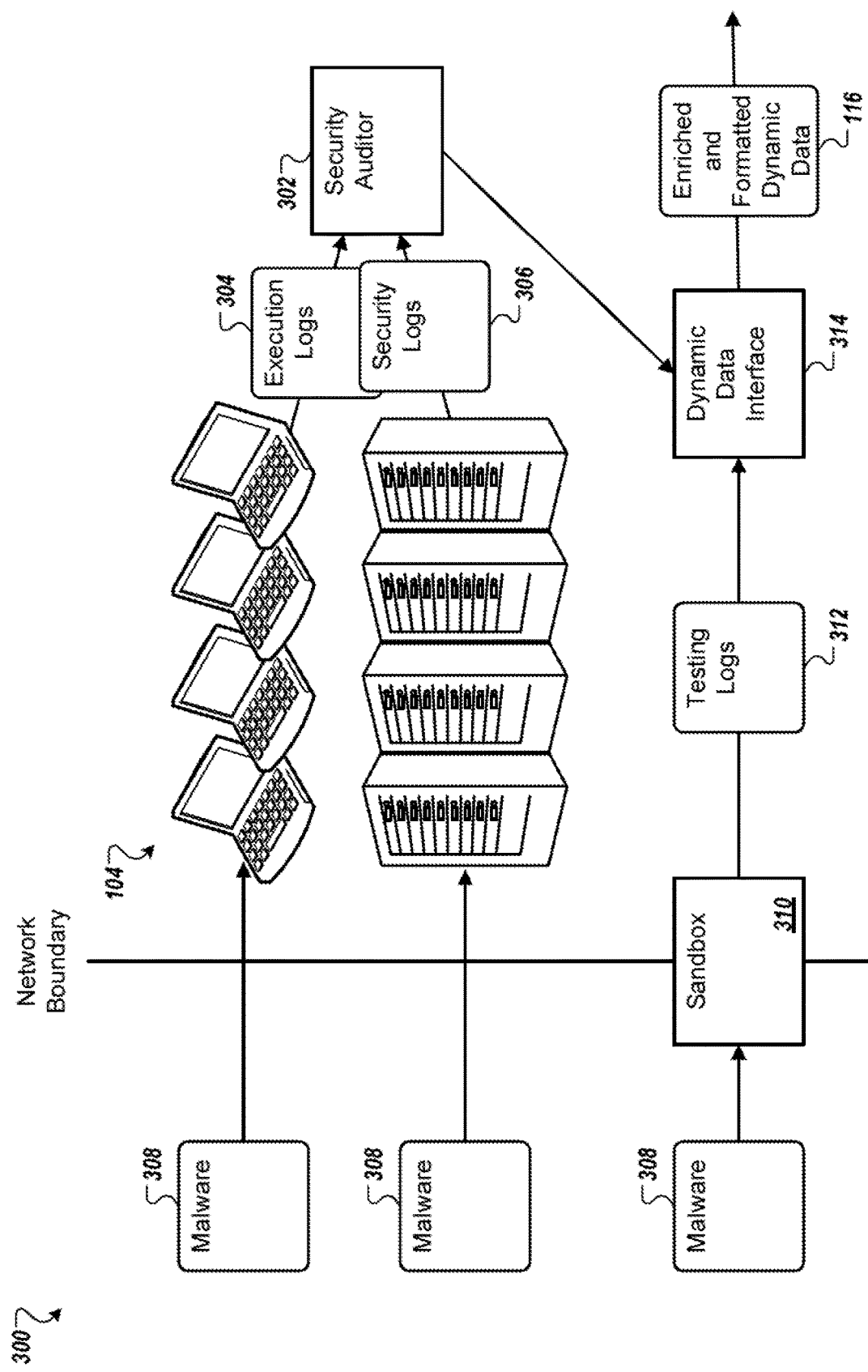
FIG. 3 is a block diagram of an example system for generating enriched and formatted dynamic data.

FIG. 3 is a block diagram of an example system 300 for generating enriched and formatted dynamic data 116. The system 300 may be used, for example, to create the dynamic data pipeline 114 discussed above. However, another system or systems may be used to create a dynamic data pipeline 116.

In the system 300, data from various data sources is collected. Generally speaking, these data sources provide information about the execution of applications, including or specifically malware applications. Execution includes, but is not limited to, the execution of binary files, interpretation of scrips, running macros, or the like. In some cases, these executions may be initiated specifically for the gathering of security information. In some cases, these executions may be initiated intentionally or accidentally but without intent to execute malicious behavior in malware. That is to say, the malware may be executed on purpose for security reasons, or by accident in the normal course of operation.

A security auditor 302 can operate to audit and enforce security policies of a network. For example, the security auditor 302 can provide a security analyst with a user interface to review activities within the network, schedule security tasks, etc. The security auditor can access logs from the resident machines 104 in order to gain access to information showing activities that the resident machines 104 have undertaken and/or are undertaking.

The security auditor 302 can access execution logs 304 from the resident machines 104. Execution logs 304 can contain information identifying execution of the resident machines 104. This execution can include malicious execution of malware 308 on resident machines 104. For example, the execution logs 304 may include information about access attempts to read data from hard disks, about data sent outside of the network boundary 208, etc.

In some cases, the security auditor 302 can examine the execution logs 304 in response to identifying the malicious execution. For example, a resident machine 104 can generate a security warning when an anti-malware application discovers a malware attack on itself. In another example, the security auditor 302 may sniff network traffic an identify communication indicative of a malware execution. In another example, the security auditor 302 can parse execution logs 304 and identify evidence of malicious execution within the execution logs 304.

Responsive to identifying the malicious execution, the security auditor 302 can access the execution logs 304 recording events related to the malicious execution. For example, the security auditor 302 can send a request to the resident machines 104 for the execution logs 304. For example, the security auditor 302 can receive execution logs 304 on a regular basis and then access the execution logs 304 from storage in response to identifying the malicious executions. In some cases, the resident machines 104 send, and/or the security auditor 302 can request, the execution logs 304 for other reasons or on other schedules.

The security auditor 302 can access security logs 306 from the resident machines 104. Security logs 306 can contain information identifying an attack on the network with malware 308. For example, the malware 308 may gain ingress onto a resident machine 104 on the network and be detected by one or more security countermeasures of the resident machine 104 or another system on the network. This may include, for example, a macro embedded within a document being detected before being loaded, a network sniffer identifying unexpected network traffic, or a monitor application identifying a failed unauthorized access of a sensitive data file. The security auditor 302 may make this identification, or receive a notification from another system that such an identification has been made.

Responsive to identifying the attack on the network with malware 308, the security auditor 302 can access security logs recording events related to the attack. For example, the security auditor 302 can send a request to the resident machines 104 for the security logs 306. For example, the security auditor 302 can receive security logs 306 on a regular basis and then access the security logs 306 from storage in response to identifying the attack. In some cases, the resident machines 104 send, and/or the security auditor 302 can request, the security logs 306 for other reasons or on other schedules.

In general, identification of execution of malware involves identifying execution or attempted execution of malware, regardless of the cause of the execution. Identification of an attack, on the other hand, involves identification of actions taken to damage the network or place malware on the network. This can include communications containing malware, infiltration of data, impersonation of authorized users, etc.

The network can use edge protection schemes to prevent malware 308 or an attack from entering crossing the network boundary 208. For example, a sandbox 310 may be positioned on the network boundary 208 for the purposes of testing data as the data passes through the network boundary 208. For example, gateways of the network can receive messages with testable data and route the messages to the sandbox 310. The sandbox 310 can load data of the message into a sandboxed environment to test, one or more times, the behavior of the data and report back a result of the test. The network gateway can then decide to drop the message or pass the messages. In some cases, the sandbox 310 is operated in a device physically present in the same geographic location as the network gateway. In some cases, the sandbox 310 is a service provided by a third party provider with no physical presence with the gateway.

A dynamic data interface 314 can access testing logs 312 that contain the results of the tests by the sandbox 310. For example, responsive to the loading of the malware 308 into the sandbox environment, the dynamic data interface 314 can access the testing logs 312. For example, the dynamic data interface 314 can send a request to the sandbox 310 for the testing logs 312. For example, the dynamic data interface 314 can receive testing logs 312 on a regular basis and then access the testing logs 312 from storage in response to loading malware 308 into the sandbox. In some cases, the sandbox 310 can send, and/or the dynamic data interface 314 can request, the testing logs 312 for other reasons or on other schedules.

The dynamic data interface 314 can receive information related to dynamic testing of malware 308. The dynamic data may come into the dynamic data interface 314 along one or more different communication channels and formatted according to one or more different formats. As such, the dynamic data interface 314 can be configured to receive data along different communication channels. The dynamic data interface 314 can also be configured to reformat the incoming into a formatted dynamic data 116 such that all the formatted dynamic data 116 conforms to a single format. The formatted dynamic data 116 can include information about malware generated during dynamic analyses of malware performed outside of a network to be protected by the system. The formatted dynamic data 116 can also or alternatively include information about malware generated during dynamic analyses of malware performed inside of the network to be protected by the system.

Figure 4:
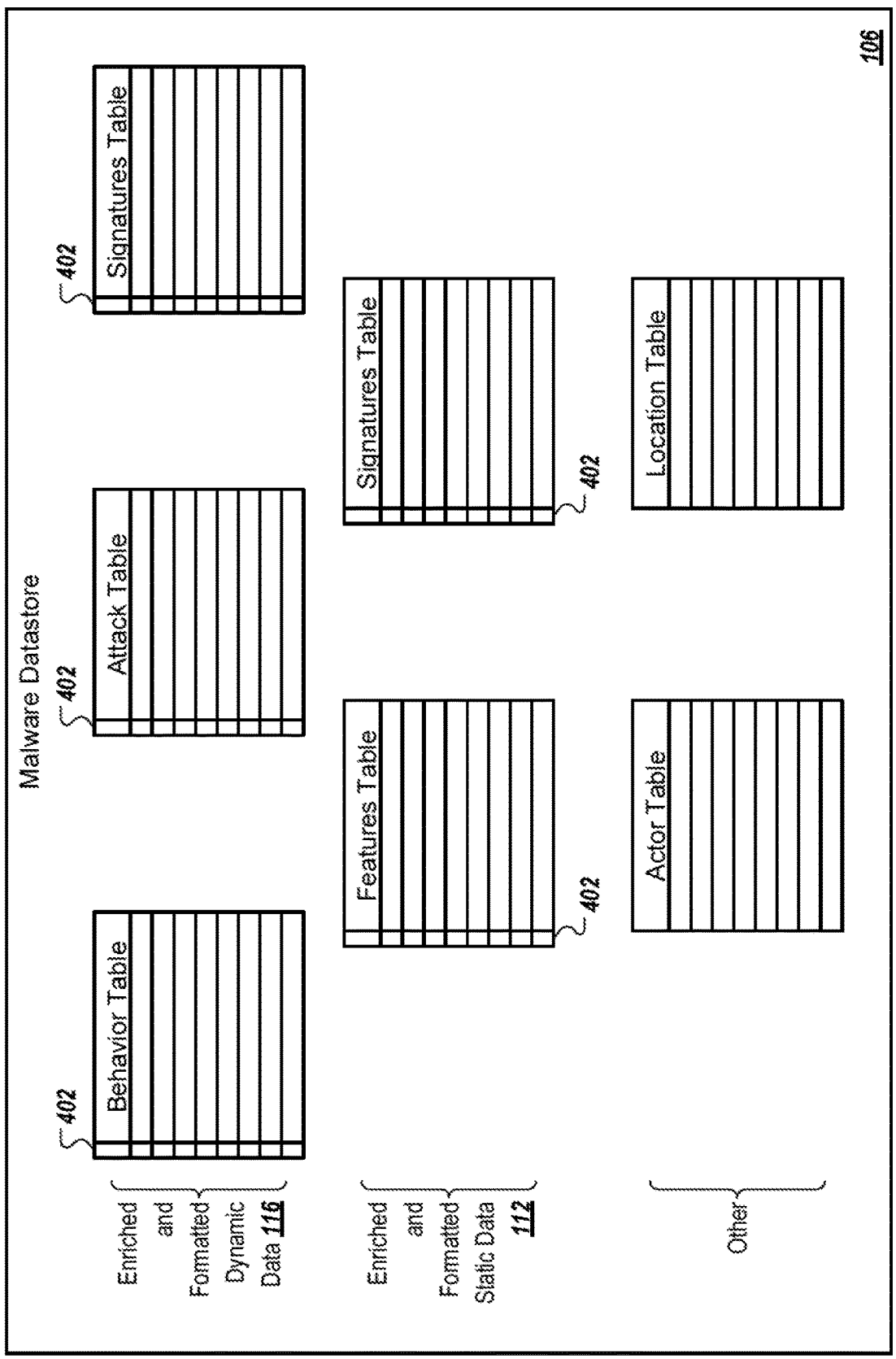
FIG. 4 is a schematic diagram of an example datastore for storing enriched information about malware.

FIG. 4 is a schematic diagram of an example datastore 106 for storing enriched information about malware. The malware datastore 106 can store the enriched and formatted static data 112, the enriched and formatted dynamic data 116, and other data for future use. For example, the malware datastore 106 can provide access to the stored data to clients such as the analysis client 108.

The malware database can store the enriched and formatted static data 112, the enriched and formatted dynamic data 116 in separated documents such as tables, objects, etc., that each contain one entry per malware entity or event, and each entry contains one or more records. For example, each entry may represent a single test, a single instance of malware, or a single attack.

Each entry of each document in the enriched and formatted static data 112, and the enriched and formatted dynamic data 116 can include index values 402 that uniquely identify the entry in the document. These indexes might be, for example, a hash of a file, a timestamp that a sandbox test was performed, etc. These index value need not explicitly identify a particular malware. For example, a particular malware may be permutated into a dozen different files each containing different code, thus having different hash values. As such, the index values alone do not identify all entries in a document related to the same malware. Instead, a security analyst can use the analysis client 108 to query the contents of the malware datastore 106 to identify correspondences, correlations, and other inferences from the data.

The index values can be specified in the first data format to which the enriched and formatted static data 112 complies and the second data format to which the enriched and formatted dynamic data 116 complies. In some cases, the enriched and formatted static data 112, and the enriched and formatted dynamic data 116 can include some of the same data in the indexes. For example, the first data format can comprise a first plurality of fields including a particular subset of fields. The second data format can comprise a second plurality of fields that is different from the first plurality of fields but that also include the particular subset of fields.

In some cases, the enriched and formatted static data 112, and the enriched and formatted dynamic data 116 include no similar data in their indexes. For example, the first and second data formats may contain no subset of similar records used to create indexes. Further, the different documents in the malware database 106 may in some cases share no data across indexes within the enriched and formatted static data 112 and/or within the enriched and formatted dynamic data 116. As such, the malware datastore 106 may be implemented as either a relational or non-relational database. In either case though, the indexes may be built and maintained, for example, to improve search speed and efficiency.

While the example datastore 106 is depicted as including separate tables for different types of data (e.g., behavior table, attack table), other breakdowns of tables and indices are also possible. For example, there may be multiple different tables that are correlated with each other (one-to-many correlation, many-to-many correlations, many-to-one correlations) for each of these and other tables. Additionally, there may be multiple indices per table, including indices across multiple and/or all fields within each data field, which can permit faster and more efficient querying. The tables can include fields that are added through data enrichment, as described above, and those data enrichment-based fields can be indexed and searchable in a similar manner.

Figure 5:
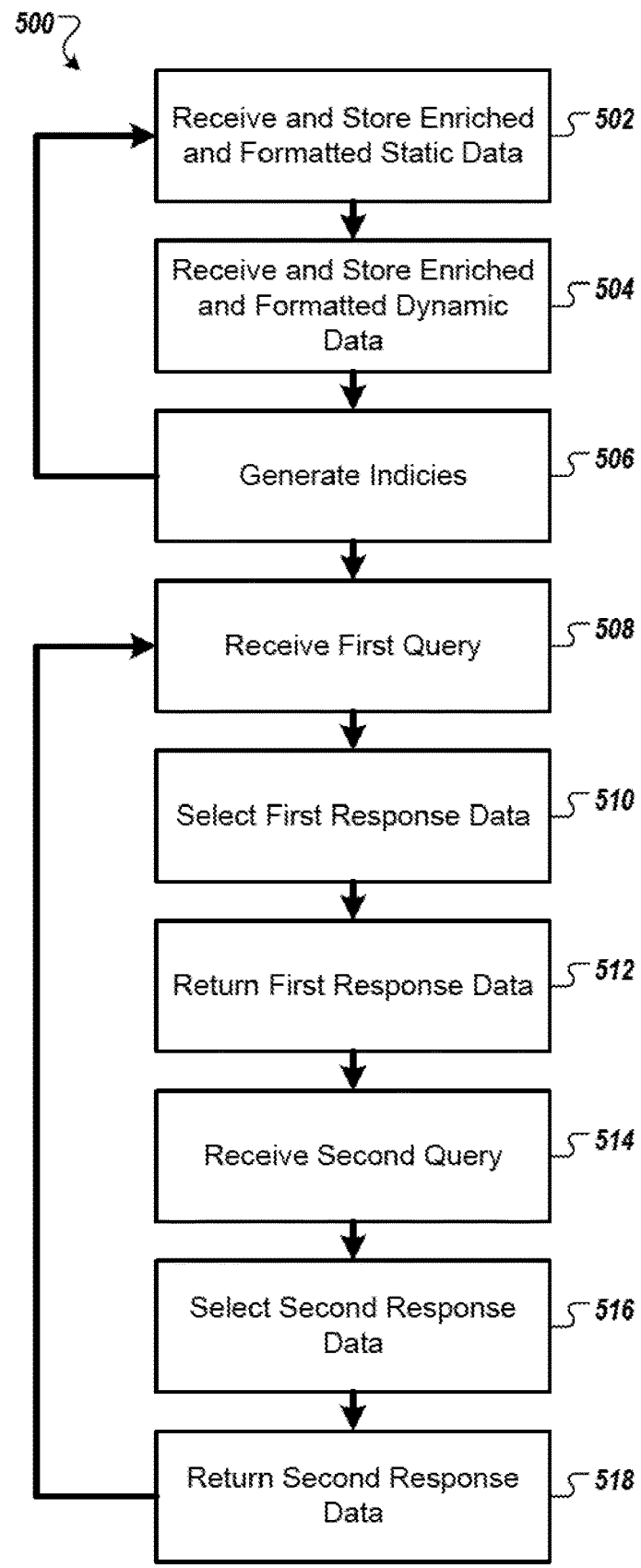
FIG. 5 is a flowchart of an example process for responding to queries about malware.

FIG. 5 is a flowchart of an example process 500 for responding to queries about enriched malware. The process can be used, for example, by the malware datastore 106. As such, the description that follows will be described with reference to elements of the system 100. However, a different number, type, and configuration of elements can be used to perform the process 500 and/or a similar process.

In the process 500, the enriched malware datastore 106 builds a set of data related to malware and malware attacks. Initially, structured data is received, enriched, and stored. The malware datastore 106 then builds one or more indices that link together data entries that are or have been determined to be related to each other, including indexing enriched data fields. These indices are then used, in part, to answer queries about data in the datastore 106 so that a security analyst can learn more about security incidents that affect a network the security analyst is analyzing.

Enriched and formatted static data is received and stored 502. For example, the malware datastore 106 can receive the enriched and formatted static data 112 from the static data pipeline 110. The enriched and formatted dynamic data is received and stored 504. For example, the malware datastore 106 can receive the enriched and formatted dynamic data 116

Indices that link stored enriched and formatted static data and stored formatted dynamic data that share similar properties are generated 506. For example, if various entries in the static and dynamic data contain identical values (e.g., identical hash values) or values near to each other (e.g., timestamp values within minutes of each other), an index can be created that links these entries together. In some cases, the creation of these indices may be user driven. Using information from the malware datastore 106, information from other sources, and their professional skills, a security analyst may determine that various entries in the enriched malware datastore 106 are linked in some way. For example, malware entering the network over the course of weeks, but all with the same target and with file encryption behavior may be noticed by the security analyst. The security analyst may then decide that it is likely that all these entries are related to the same persistent threat. In the user interface of the analysis client 108, the security analyst may flag these entries as all part of a single attack and the malware datastore 106 can build an index linking these entries together.

Receiving data 502-504 and building indices 506 may occur on an ongoing basis. For example, the data from the pipelines can be received as it is available and added when received such that the data in the malware datastore 106 is constantly being updated. Similarly, the indices may be created on an ongoing basis. For indices created by fully-automated process, the indices may be built, for example, on a regular schedule, when new data becomes available, as security analysts create them, etc.

A first query is received 508. For example, an analyst using the analyst client 108 may provide user input that causes the analysis client 108 to issue a query to the enriched malware datastore 106 to search and return some data. This query may take the form of a structured query language including, but not limited to, the Structured Query Language (SQL) or another appropriate language. The query may include one or more search parameters that define the search that should be performed by the malware datastore 106.

Using the indices, first response data for the first query is selected from the stored formatted static data and from the stored enriched and formatted dynamic data 510. For example, the malware datastore 106 may engage a query engine to parse the first query to extract the search parameters. The malware datastore 106 can then identify entries that match the search parameters and load those into a memory buffer to prepare them for returning.

To aid in this searching, the malware datastore 106 can use one or more indexes to find entries responsive to the query. For example, a query may search for any malware attacks in the last 24 hours. The malware datastore 106 may identify one attack that has a timestamp within the requested time window. The record for this attack may include, for example, the timestamp, a hash of the file used in the attack, a network identifier of the targeted resident machine 104, and a malware-type field (e.g., dropper). The record may also include data for an index that matches the entry for this this attack to three other entries for attacks performed in the last month. These other attacks may have been identified, for example, based on a similar behavioral signature of the malware found during dynamic execution. Further, these four entries may each reference some entries of static data by way of the index. All of these related entries may be gathered by the malware datastore 106.

A first response for the first query is returned. The first response includes the first response data 512. For example, malware datastore 106 can collect all of the data identified for response and return that to the analysis client 108.

After returning the first response, a second query is received. The second query contains, as a search parameter, a subset of the first response data 514. For example, the security analyst may see the four instances of a dropper being targeted at the same resident machine 104 and become concerned that the network 102 is undergoing a persistent spearphishing attack on a computer used by a user with elevated permissions to some sensitive financial data. In such a case, the security analyst may select a small handful of the records returned and request a search on those records using the values in those records. For example, the second query may ask for instances of malware compiled at or near the same time as the malware used in those for attacks.

Using the indices and based on the search parameter, second response data for the second query is selected from the stored formatted static data and from the stored formatted dynamic data 516. For example, malware datastore 106 may use an index built on compile timestamps to quickly identify other attacks using malware compiled at the same time. A second response to the second query is returned. The second response includes the second response data 518. For example, the malware datastore 106 can return the entries related to the other attacks.

In some cases, the first response data comprises a plurality of entries, each entry comprising a plurality of records and the subset of the first response data used as the search parameter is some, but not all, of the plurality of records of the entries of the plurality of entries of the first response data. As shown in FIG. 4, the malware datastore 106 can store entries in the form of rows of tables. Each of these rows may be made of records stored as cells. The first response can include some entries (i.e. rows). The second query can call for an expanded search in which more and/or different rows are returned.

For example, a security analyst can use the first query to call up an entry about one particular file. The security analyst can see that the response to the query indicates the malware using a command-and-control server the analyst is not familiar with. The security analyst may then use the second query to call up, for example, all other malware that uses that command-and-control server, to see if there is anything to be learned from that group.

In some cases, the first response data comprises a plurality of entries, each entry comprising a plurality of records; and the second response data comprises a second plurality of records, at least some of the second plurality of records not included in the first plurality of records such that the second response returns information that was not included in the first response. For example, to perform the search on the command-and-control server, the security analyst may review the results of the first query. These results, made up of an entry for the file at issue with each entry containing a group of records, can be used as the basis of a second search. In such a case, the analyst may indicate that they wish to execute a search using one record of the entry, the command-and-control record. In addition, the analyst may also limit the search with one or more parameters (e.g., within a time window). These additional limits may be based on the first search results or newly entered by the security analyst.

After the second response is returned, the malware datastore can remain ready to answer more queries, and to receive more formatted data and build more indices. Indeed, the malware datastore 106 is capable of performing various actions simultaneously. For example, if in identifying data responsive to a query, a new correspondence is found, the malware datastore 106 can generate or update an index while preparing response data for the query.

By using the technology described in this document, correspondences found between malware data can be used to increase the search speed and efficiency of the malware datastore 106. This improvement to data storage and retrieval allows for technological improvements when particular domain-specific (i.e. security-type) data is available for use.

Figure 6:
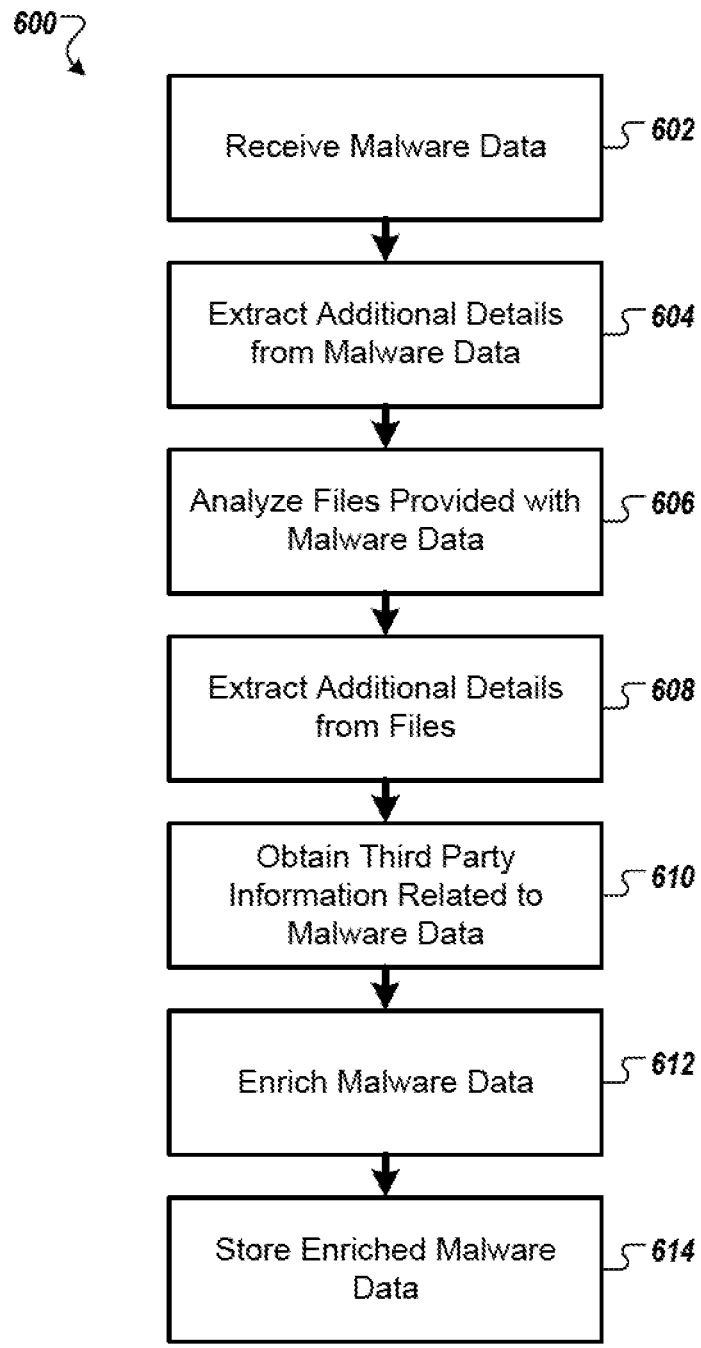
FIG. 6 is flowchart of an example process for enriching malware data.

FIG. 6 is flowchart of an example process 600 for enriching malware data. The example process 600 can be used, for example, by the machined 104 to enrich the malware data from the data pipelines 110, 114 for storage in the malware datastore 106. As such, the description that follows will be described with reference to elements of the system 100. However, a different number, type, and configuration of elements can be used to perform the process 600 and/or a similar process.

Malware data can be received (602). The malware data can include, for example, information via the static and dynamic pipelines 110 and 114, respectively. As discussed above, the malware data can include one or more data fields as well as one or more associated files, such as the malware itself (e.g., macro, script, executable), a file containing the malware (e.g., MS OFFICE file containing malicious macro), files carrying the malware (e.g., email including the malware as an attachment, network message containing or referencing the malware), traces of operations performed by the malware (e.g., system/device process traces), and/or other information.

Additional details can be extracted from the malware data itself (604). For example, the machine 104 can analyze the malware data that is received and can extract additional and/or alternative information to be stored in separate data fields for the malware data. For example, timing information, location information, and/or other details can be extracted from the malware data and, by itself, used to enrich the malware data and/or used to identify other information that can be used to enrich the malware.

Files provided as part of the malware data can be analyzed (606) and additional details can be extracted from the files to enrich the malware data (608). For example, the machine 104 can analyze emails (example files) that were used to transport the malware and that are provided with the malware can be analyzed, documents that contain the malware (e.g., MS OFFICE documents) can be analyzed, malware process behavior can be analyzed, network details (e.g., malware trace information) can be analyzed, and/or other associated files can be analyzed.

Details to be added to the malware data can be extracted from such files, such as sender information (e.g., email address, IP address), receiver information, subject (e.g., title, keywords), message body information (e.g., keywords used, textual encoding, message type, language), attachment information (e.g., number of attachments, types of attachments, attachment file names), email header information (e.g., originating server, timestamp), and/or other email details. Additionally and/or alternatively, extracted details can include location information for the malware (e.g., IP address from which the malware originated, geographic region from which the malware originated, IP address at which the malware was detected, geographic region where the malware was detected), an entry point onto the network (e.g., network port used), domain name system (DNS) information (e.g., DNS identifier for the sender, DNS identifier for the recipient), network transmission protocols that were used (e.g., HTTP, FTP, SMTP, POP), and/or other network information. Additionally and/or alternatively, extracted details can include as metadata (e.g., author, time of creation, edit history, MS OFFICE version, rich formatted text metadata, pdf metadata), presentation information (e.g., number of slides, type of content included in slides, slide transitions), macro information (e.g., macro language and version, function calls), language information, linked libraries, permissions, encodings, and/or other document information. Additionally and/or alternatively, extracted details can include information related to file system behavior (e.g., file system operations requested/performed by the malware), process behavior (e.g., CPU usage, memory usage, operations requested/performed), registry behavior (e.g., registry read/write operations performed/requested), service behavior (e.g., services accessed by the malware), thread behavior (e.g., number of threads instantiated by the malware), network behavior (e.g., network sockets requested, network traffic, sender/receiver information for network traffic), and/or other process behavior.

Third party information related to the malware data can be obtained (610). For example, the machines 104 can use the information obtained from steps 604-608 to query one or more third party services for additional information related to the malware. For example, third party services can track and/or aggregate votes that indicate whether other security analysts/firms have identified code as malicious, harmless, and/or other designators. In another example, location information can be generated from one or more third party services, which can correlate various information from the malware data (e.g., IP address) into geolocation information (e.g., city, state, country, region). In another example, historical information for malware instances can be referenced from one or more third party services, such as a date on which the malware instance was first detected, a date on which it was last detected, a frequency over a recent period of time (e.g., number of detections per day over the past week, month, year), and/or other details.

The additional malware details determined from steps 604-610 can be used to enrich the malware data (612). For example, the machine 104 can add the additional details to the malware data as additional fields that can be indexed and searched. The enriched data can be stored (614). For example, the machine 104 can store the enriched malware data in the malware datastore 106 for analysis and processing.

Figure 7:
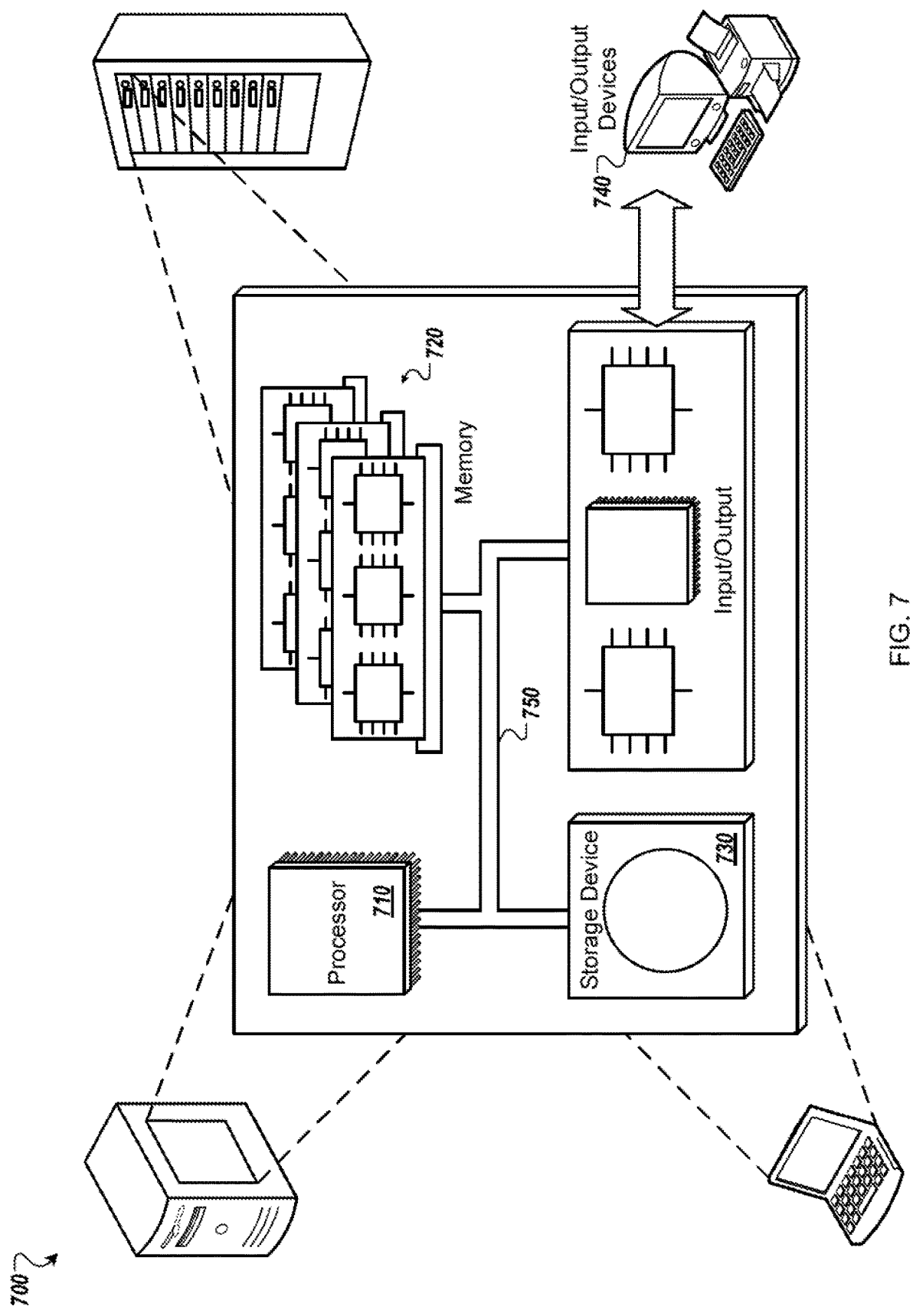
FIG. 7 is a schematic diagram that shows an example of a computing device and a mobile computing device.

FIG. 7 is a schematic diagram that shows an example of a computing system 700. The computing system 700 can be used for some or all of the operations described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machinereadable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system for enriching malware data for security analysis, the system comprising:
   one or more malware data pipelines configured to provide malware data that includes original data fields identifying information for detected malware instances and corresponding files that are associated with the detected malware instances, at least some of the corresponding files being malware files of the detected malware instances, and at least some other of the corresponding files being carrier files that contained the malware files in data transit, wherein the corresponding files include malware process behavior trace files generated from running the detected malware instances, wherein the one or more malware data pipelines include:
      a static data pipeline configured to generate enriched and formatted static data, the enriched and formatted static data being enriched by malware enrichment circuitry and formatted according to a first data format that is associated with static data related to malware, the enriched and formatted static data recording information about malware generated during static analyses of malware performed outside of a network to be protected by the system, and
      a dynamic data pipeline configured to generate enriched and formatted dynamic data generated by observation of execution of the malware files in a test environment, the enriched and formatted dynamic data being enriched by the malware enrichment circuitry and formatted according to a second data format different than the first data format, the second data format being associated with dynamic data related to malware, the enriched and formatted dynamic data recording information about malware generated during dynamic analyses of malware performed within a network to be protected by the system;
   the malware enrichment circuitry being configured to identify additional information to include in enriched data fields for the detected malware instances, the additional information being identified from the malware files of the corresponding files and also from the carrier files of the corresponding files, wherein the enriched data fields include the additional information extracted from the malware process behavior trace files, wherein the enriched data fields include file system behavior for the detected malware instances, process behavior for the detected malware instances, and registry behavior for the detected malware instances; and
   a datastore configured to:
      store, after the execution of the malware files in the test environment, the malware data with the original data fields and the enriched data fields, wherein the datastore includes indices for both the original data fields and the enriched data fields to permit for searching and analysis across the original data fields and the enriched data fields of a particular malware instance, wherein at least some of the indices are identifiers of the malware files of the corresponding files and at least some of the indices are identifiers of the carrier files of the corresponding files;
      receive a first query;

select, using the indices, first response data for the first query from the stored enriched and formatted static data and from the enriched and stored formatted dynamic data; and return a first response to the first query comprising the first response data.

2. The system of claim 1, wherein:
the corresponding files include emails with attachments that included the detected malware instances, and
the enriched data fields include the additional information extracted from the emails.

3. The system of claim 2, wherein the enriched data fields include one or more of: email sender information, email receiver information, email subject information, email message body information, email attachment information, and email header information.

4. The system of claim 1, wherein:
the corresponding files include malware trace files generated from the detected malware instances running on a computing device, and
the enriched data fields include the additional information extracted from the malware trace files.

5. The system of claim 4, wherein the enriched data fields include one or more of: an IP address from which the malware originated, an IP address at which the malware was detected, a network port the malware attempted to exploit, domain name system information, and network transmission protocols.

6. The system of claim 1, wherein:
the corresponding files include office documents with macros that included the detected malware instances, and
the enriched data fields include the additional information extracted from the office documents.

7. The system of claim 6, wherein the enriched data fields include one or more of: author information for the office documents, time of creation for the office documents, edit history for the office documents, office version information, size of office document, type of content included in office document, language used for the macros, version of the language for the macros, function calls used for the macros, permissions for the office documents, linked libraries for the office documents, and encodings included in the office documents.

8. The system of claim 7, wherein the office documents include WORD documents, POWERPOINT presentation documents, and EXCEL spreadsheet documents.

9. The system of claim 1, wherein the enriched data fields additionally include one or more of: service behavior for the detected malware instances, thread behavior for the detected malware instances, and network behavior for the detected malware instances.

10. The system of claim 1, wherein:
the additional information includes votes from security analysts as to whether the detected malware instances are malicious or benign that are tracked and provided by one or more third party services, and
the enriched data fields include the additional information obtained from the one or more third party services to track votes for the detected malware instances.

11. The system of claim 1, wherein:
the additional information includes geographic location information correlated to the detected malware instances are malicious or benign that are provided by one or more third party services, and the enriched data fields include the additional information obtained from the one or more third party services for the detected malware instances.

12. The system of claim 1, wherein:
the additional information includes historical information on the detected malware instances are malicious or benign that are provided by one or more third party services, and
the enriched data fields include the additional information obtained from the one or more third party historical malware information services for the detected malware instances.

13. A method performed by data processing apparatuses, the method comprising:
providing, using one or more malware data pipelines, malware data that includes original data fields identifying information for detected malware instances and corresponding files that are associated with the detected malware instances, at least some of the corresponding files being malware files of the detected malware instances, and at least some other of the corresponding files being carrier files that contained the malware files in data transit wherein the corresponding files include malware process behavior trace files generated from running the detected malware instances, wherein the one or more malware data pipelines include:
a static data pipeline configured to generate enriched and formatted static data, the enriched and formatted static data being enriched by malware enrichment circuitry and formatted according to a first data format that is associated with static data related to malware, the enriched and formatted static data recording information about malware generated during static analyses of malware performed outside of a network to be protected by the system, and
a dynamic data pipeline configured to generate enriched and formatted dynamic data generated by observation of execution of the malware files in a test environment, the enriched and formatted dynamic data being enriched by the malware enrichment circuitry and formatted according to a second data format different than the first data format, the second data format being associated with dynamic data related to malware, the enriched and formatted dynamic data recording information about malware generated during dynamic analyses of malware performed within a network to be protected by the system;
identifying additional information to include in enriched data fields for the detected malware instances, the additional information being identified from the malware files of the corresponding files and also from the carrier files of the corresponding files, wherein the enriched data fields include the additional information extracted from the malware process behavior trace files, wherein the enriched data fields include file system behavior for the detected malware instances, process behavior for the detected malware instances, and registry behavior for the detected malware instances;
storing, after the execution of the malware files in the test environment and in a datastore configured to store the malware data with the original data fields and the enriched data fields, the malware data with the original data fields and the enriched data fields, wherein the datastore includes indices for both the original data fields and the enriched data fields to permit for searching and analysis across the original data fields and the enriched data fields of a particular malware instance, wherein at least some of the indices are identifiers of the malware files of the corresponding files and at least some of the indices are identifiers of the carrier files of the corresponding files;

receiving a first query;

selecting, using the indices, first response data for the first query from the stored enriched and formatted static data and from the enriched and stored formatted dynamic data; and returning a first response to the first query comprising the first response data.

14. A non-transitory computer storage media encoded with computer program instructions that, when executed by one or more processors, cause a computer device to perform operations comprising:

providing, using one or more malware data pipelines, malware data that includes original data fields identifying information for detected malware instances and corresponding files that are associated with the detected malware instances, at least some of the corresponding files being malware files of the detected malware instances, and at least some other of the corresponding files being carrier files that contained the malware files in data transit, wherein the corresponding files include malware process behavior trace files generated from running the detected malware instances, wherein the one or more malware data pipelines include:

a static data pipeline configured to generate enriched and formatted static data, the enriched and formatted static data being enriched by malware enrichment circuitry and formatted according to a first data format that is associated with static data related to malware, the enriched and formatted static data recording information about malware generated during static analyses of malware performed outside of a network to be protected by the system, and a dynamic data pipeline configured to generate enriched and formatted dynamic data generated by observation of execution of the malware files in a test environment, the enriched and formatted dynamic data being enriched by the malware enrichment circuitry and formatted according to a second data format different than the first data format, the second data format being associated with dynamic data related to malware, the enriched and formatted dynamic data recording information about malware generated during dynamic analyses of malware performed within a network to be protected by the system;

identifying additional information to include in enriched data fields for the detected malware instances, the additional information being identified from the malware files of the corresponding files and also from the carrier files of the corresponding files, wherein the enriched data fields include the additional information extracted from the malware process behavior trace files, wherein the enriched data fields include file system behavior for the detected malware instances, process behavior for the detected malware instances, and registry behavior for the detected malware instances;

storing, after the execution of the malware files in the test environment and in a datastore configured to store the malware data with the original data fields and the enriched data fields, the malware data with the original data fields and the enriched data fields, wherein the datastore includes indices for both the original data fields and the enriched data fields to permit for searching and analysis across the original data fields and the enriched data fields of a particular malware instance, wherein at least some of the indices are identifiers of the malware files of the corresponding files and at least some of the indices are identifiers of the carrier files of the corresponding files;

receiving a first query;

selecting, using the indices, first response data for the first query from the stored enriched and formatted static data and from the enriched and stored formatted dynamic data; and returning a first response to the first query comprising the first response data.

15. The system of claim 1, wherein the system further comprises:

a network boundary; and a plurality of resident machines within the network boundary; and wherein the carrier files contained the malware files in data transit across the network boundary toward at least one of the resident machines.

16. The system of claim 15, wherein at least some of the corresponding files are internal files containing information about the malware instance generated based on analysis performed on the malware instance after the malware instance has passed the network boundary to enter the network and at least some of the corresponding files being external files generated by an external security vendor based on analysis performed on similar malware found to have attacked a second network different than the network.

17. The system of claim 16, wherein the datastore is configured to respond to queries with results that include malware files of the corresponding files, carrier files of the corresponding files, internal files of the corresponding files, and external files.

* * * * *